350-393 SR

XR 3,849,732 4026 T

United State

Pezot

[11] 3,849,732

[45] Nov. 19, 1974

[54] PULSE GENERATOR FOR DELIVERING RECTANGULAR PULSES HAVING FAST RISE AND FALL TIMES

[75] Inventor: Jacques Pezot, Marcoussis, France

[73] Assignee: Commissariat A L'Energie Atomique, Paris, France

[22] Filed: Dec. 7, 1972

[21] Appl. No.: 313,041

[30] Foreign Application Priority Data

Dec. 17, 1971 France ............................ 71.45436

[52] U.S. Cl. .................. 328/59, 307/260, 307/263, 307/268, 328/56, 328/67, 350/160 R, 354/227

[51] Int. Cl. ........................ H03k 1/00, H03k 3/04

[58] Field of Search ............ 328/55, 56, 67, 59, 65; 307/260, 263, 265, 268, 293; 333/20

[56] References Cited

UNITED STATES PATENTS

| | | | |
|---|---|---|---|
| 3,122,648 | 2/1964 | Rufer | 328/67 X |
| 3,141,111 | 7/1964 | Godlove | 328/67 X |
| 3,405,287 | 10/1968 | Miller | 328/67 X |
| 3,423,595 | 1/1969 | Hickey | 328/67 X |

OTHER PUBLICATIONS

"PNPN Silicon Epitaxial Planar Switches" by Sylvania, "Typical Application Circuits" (Pulse Generator) Received 6/8/64.

IBM Tech. Disclosure Bulletin "Solid State Variable Pulse Width Generator" by Meehan, Vol. 8; No. 12, May 1966, page 1855.

"A High Voltage Pulser for Fast Variable Length Rectangular Pulses" by Howells et al., Journal of Physics E: Scientific Instruments 1970, Vol. 3, pp. 792–794.

*Primary Examiner*—Stanley D. Miller, Jr.
*Attorney, Agent, or Firm*—Flynn & Frishauf

[57] ABSTRACT

A steady voltage applied to a voltage sensitive device such as a Kerr cell or a Pockels cell is caused to be interrupted by a sharp, brief, square pulse, during which the applied voltage is zero, by means of a single d.c. voltage generator operating through a series impedance into two transmission lines of substantially the same characteristic impedance. One line is connected between the generator (i.e., its series impedance) and the load, which is a high impedance, and the other line has one end connected to the generator (i.e., its series impedance) over a switch and its other end connected to a high impedance which acts as an effective open circuit. Closing the switch produces a series of substantially zero voltage intervals across the load, the period being determined by the combined length of the lines and the duty cycle by their relative length, but after the first few pulses the dissipation in the transmission lines and their terminations prevents the voltage from dropping all the way to zero, but for laser triggering only the first pulse is normally needed and the subsequent ones cause no disturbance.

3 Claims, 7 Drawing Figures

3849732
OR IN 328/59

PULSE GENERATOR FOR DELIVERING RECTANGULAR PULSES HAVING FAST RISE AND FALL TIMES

This invention relates to a generator for producing rectangular electrical pulses having fast rise and fall times. The invention finds an application in physics, in the supply of voltage to electrooptical cells and more particularly in the voltage supply to shutters which are used for triggering lasers.

It is known that the conventional shutters which utilize either the Kerr effect or the Pockels effect entail the need for voltages of the order of 10 kV and, in the case of utilization for the triggering of lasers, for pulses having widths of a few hundred nanoseconds with a rise time of a few nanoseconds. Voltage pulses of this type are usually obtained from coaxial lines which are charged electrostatically by means of auxiliary generators. The cells which make use of the Kerr effect or the Pockels effect are usually placed in a polarizer-analyzer system, the complete assembly being such as to form an ultra-fast shutter. Should the cell be placed between an analyzer and a polarizer, it is always possible to arrange these two elements so that a square-topped voltage pulse should make the system transparent. When no voltage is applied to the cell, the assembly is opaque (the analyzer and the polarizer are therefore crossed). The generation of a square-topped pulse of this type is usually carried out by means of a generator which produces a voltage 2U, and a line which is charged to said voltage 2U, where U is the desired pulse voltage. The discharge of the line produces the rectangular pulse having the desired amplitude U.

If, on the contrary, the same electrooptical cell is located within a laser cavity in which only one analyzer has been placed, it can readily be understood that transparency of a system of this type can be assured only when no voltage is applied thereto and that it the system is opaque when a voltage U is applied thereto. The opening of the device therefore calls for suppression of a voltage during a very short time interval. This is usually obtained by means of two generators, one of which continuously applies the voltage U to the, while the other charges the line at the voltage 2U. The discharge of this line produces a rectangular pulse having an amplitude U which, if the polarities are suitable, cancels the preliminary charging voltage delivered by the first generator. This device therefore calls for the use of two generators, the voltage produced by one generator being double the operating voltage of the cell. This device is therefore both heavy and cumbersome.

SUBJECT MATTER OF THE PRESENT INVENTION

The present invention overcomes these disadvantages by making it possible to employ a single generator for producing a voltage equal to the operating voltage in order to apply a voltage to the cell and then to cancel that voltage during a predetermined time interval, which has the effect of opening the shutter. This results in a device of much smaller overall size (a single generator instead of two), operating voltages which are lower than those of the prior art (a voltage U instead of a voltage 2U) and finally in much greater ease of use.

More precisely, the invention relates to a generator for producing rectangular electrical pulses having fast rise and fall times, of the type which employs a high impedance direct-current voltage source, a first transmission line charged by said source, a second transmission line substantially of/the same characteristic impedance as the first, the second line being connected at one extremity over a switch to the first line at its connection to the voltage source mismatched at the other extremity by a high impedance across which the output voltage is obtained. When the switch is operated, the first charged line is discharged through the second line and the electrostatic energy is passed from one line to the other after which the process reverses as the energy is returned to the first line, and so on.

Further properties and advantages of the present invention will become apparent from the following description with reference to the accompanying figures in which one particular form of construction of an interruption pulse generator according to the invention is described by way of explanation, but not in any limiting sense, and wherein.

Figure 3:
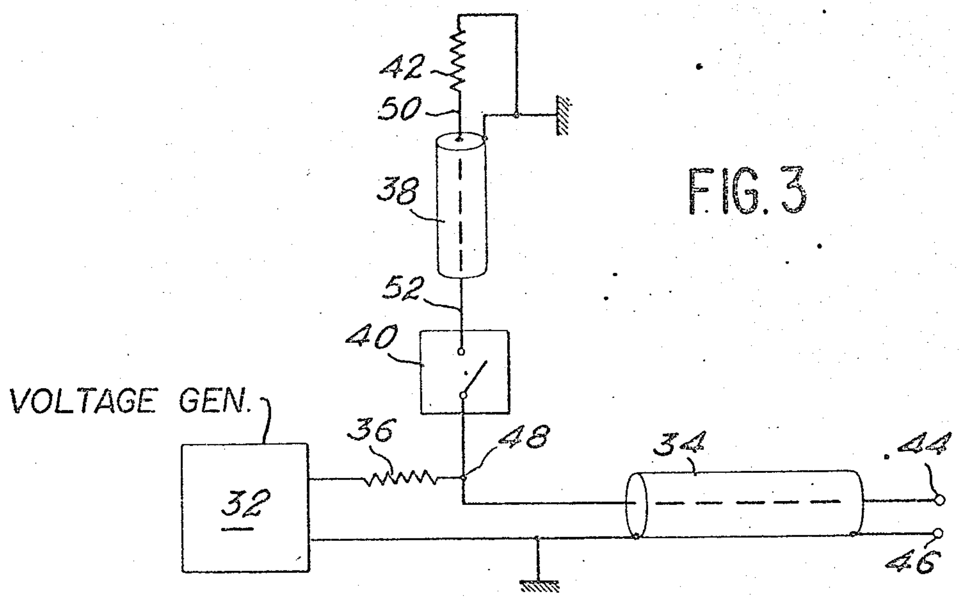
FIG. 3 is a diagram of the device according to the invention.
Figure 4A:
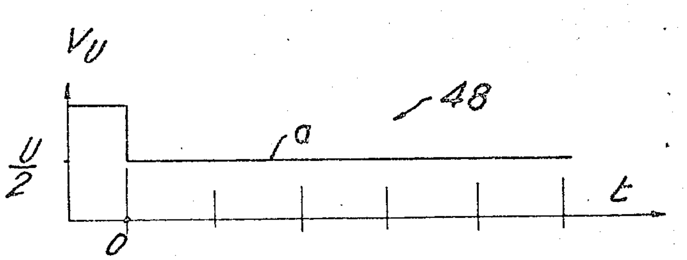
Figure 4B:
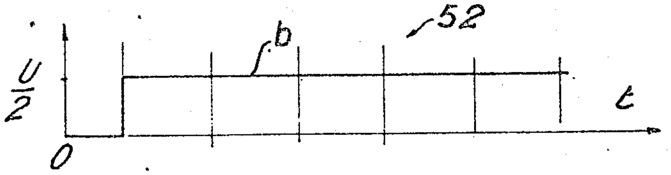
Figure 4C:
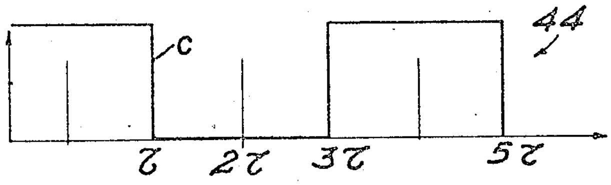
Figure 4D:
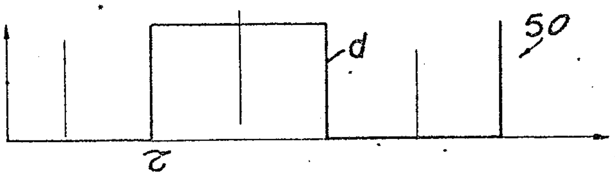

FIGS. *4a–d* are timing waveform diagrams of operation of the device of FIG. 3.

Figure 1:
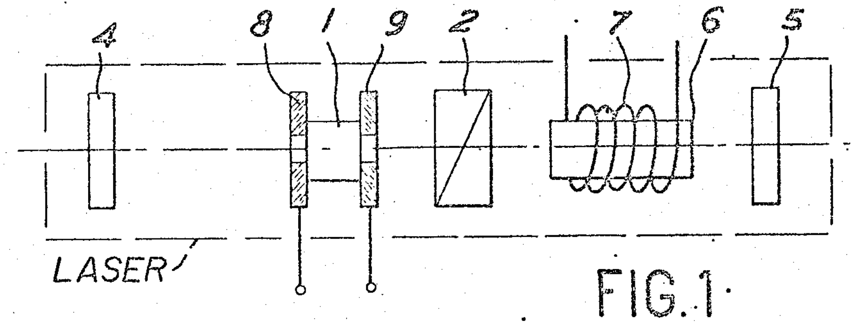
FIG. 1 shows a laser associated with an electrooptical triggering device which can be supplied by a generator in accordance with the invention.

In FIG. 1, an electrooptical cell 1 is placed between an analyzer 2 and a mirror 4; the electrooptical cell 1 can be of the type, for example, which utilizes the Pockels effect and comprises two annular electrodes 8 and 9. The mirror 4 and the mirror 5 form the Fabry-Perot cavity of the laser; there is placed within this cavity an active rod 6 which is excited by a flash tube 7.

The operation of this device is as follows: the assembly formed by the electrooptical cell 1 and the paired assembly consisting of an analyzer 2 and a mirror 4 constitutes a shutter. This shutter is transparent when no voltage is applied to the terminals of the cell 1; it will be assumed that the shutter is opaque when a voltage U is applied to the terminals of the cell 1. The state of the shutter is therefore a function of the voltage applied between the terminals 8 and 9.

Figure 2:
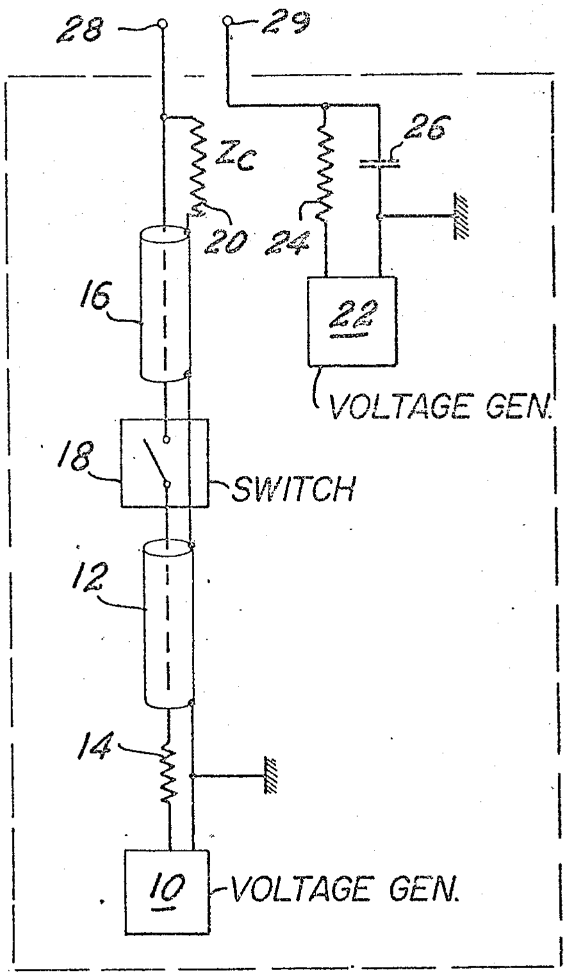
FIG.2 PRIOR ART
FIG. 2 shows a rectangular pulse generator in accordance with the prior art.

In the prior art system of FIG. 2, a voltage generator 10 which delivers a voltage 2U supplies a first transmission line 12 via a resistor 14; a second transmission line 16 is isolated from the line 12 by means of a switch 18; the line 16 is closed on an impedance 20 which is equal to the characteristic impedance $Z_c$ of the line 16; in a second generator 22 which delivers a voltage U, one of the terminals of that generator is connected to ground and the other terminal is connected to an impedance 24 having a high value with respect to the characteristic impedance $Z_c$. A decoupling capacitor 26 is connected between the impedance 24 and ground; the complete device has two output terminals 28 and 29. The outer conductors of the lines 12 and 16 are grounded. The operation of this device is as follows:

It will first be assumed that U designates the voltage to be applied between the electrodes 8 and 9 of the cell 1 in order that the shutter consisting of the cell 1, the analyzer 2 and the mirror 4 should be rendered opaque to the laser radiation. The output terminals 28 and 29 are connected to the electrodes 8 and 9, and the generator 22 continuously supplies to them a voltage equal to U. The current delivered by the generator 22 is limited by the presence of the very-high-resistance resistor 24. The generator 10 charges the line 12 to a voltage 2U. The current delivered by the generator 10 is limited by the presence of the resistor 14 which has a very high value with respect to the characteristic impedance of the lines. Since the switch 18 is open, a voltage U is applied to the electrode 9, the electrode 8 being grounded through the resistor 20. The shutter is therefore opaque. When the switch 18 is closed, the line 12 which is charged to the voltage 2U is discharged in the form of a rectangular pulse having very fast rise and fall times and an amplitude U. The duration of this pulse depends on the length of the line and, in accordance with a result which is conventional in transmission line theory, the pulse duration is equal to twice the value of the delay time of the line.

The pulse propagates within the line 16 and attains the extremity of that line at the end of a time interval which is equal to the propagation time of the line 16. At this instant, the potential of the output terminal 28 increases from O to U. The electrode 8 is therefore brought abruptly to a potential U which is equal to the potential of the electrode 9. The voltage applied to the terminals of the cell 1 therefore becomes zero and the shutter accordingly opens. The shutter remains transparent as long as the connection 28 is brought to the potential U, that is to say for a period of time equal to the duration of the rectangular pulse derived from the line 12. When the discharge of said line is completed, the potential of the output connection 28 falls abruptly to zero as is the case with the electrode 8 of the cell 1. A voltage U is therefore again applied to said cell, with the result that this latter again becomes opaque. The design function of the generator 10 is therefore to deliver a rectangular pulse which compensates for the bias voltage U delivered by the generator 22.

The object of the present invention is to provide a rectangular pulse generator which is of much more simple design and less cumbersome than the known generator which has just been described.

FIG. 3 shows a system in accordance with the invention. In this figure, a voltage source 32 charges a transmission line 34 via an impedance 36. A second transmission line 38 having electrical characteristics which are similar to those of the line 34 is isolated from this latter by a switch 40; the line 38 is terminated in an impedance 42 of very high value with respect to the characteristic impedances of the lines 38 and 34; the outer conductors of the lines 34 and 38 are each connected to ground. The output terminals of the system are the terminals 44 and 46. The reference 48 designates a circuit point located at the input end of the line 34; the reference 50 designates a circuit point located on the input side of the line 38 and the reference 52 designates a terminal which is located at the connection of the switch 40 and the line 38. The switch 40 may be a manually operated switch or a switch controlled by any well-known means.

The operation of the device aforesaid is as follows: the voltage source 32 charges the transmission line 34 to the voltage U. When the switch 40 is open, there exists a potential difference U between the terminals 44 and 46. The electrodes 8 and 9 of the cell 1 which are connected to the terminals 44 and 46 are therefore at a potential difference U, with the result that the shutter 1 is opaque. When the switch 40 is closed abruptly, the line 34 discharges into the line 38 which was initially neutral the center conductor being grounded through the high impedance 42. The discharge from the line 34 takes place in the form of a rectangular pulse having very fast rise and fall times, an amplitude U/2 and a duration which is equal to twice the transit time within the line 34.

It will first be assumed that the line 38 has the same length as the line 34 and that its electrical characteristics (self-inductance and capacitance per unit length of line and hence also the characteristic impedance) are the same as those of the line 34. At the end of a time interval $\tau$ equal to the transit time in line 34 (this time being equal to the transit time in line 38), the rectangular pulse derived from the line 34 reaches the end of the line 38. The potential of the connection 44 therefore falls abruptly from the value U to the value O whereas the potential of the connection 50 rises rapidly from the value O to the value U. At the end of a time interval equal to 2 $\tau$ starting from the instant of closure of the switch, the line 38 is accordingly charged to the voltage U and the line 34 is fully discharged. The energy stored within the line 34 has therefore been totally transferred into the line 38. Since the switch 40 is still closed, the symmetrical process can be reproduced, namely the discharge of the line 38 in favor of the line 34. During this discharge, the potential of the connection 44 will rise again to the value U and the potential of the connection 50 will fall again to the value O. Assuming that the lines and the different connections are dissipationless, the device therefore gives rise to a continuous oscillation of the energy which is stored alternately in the line 34 and in the line 38. The equality of the characteristic impedance of the two lines prevents reflection of part of the energy at the junction.

The operation of this interruption pulse generator in accordance with the invention is described in more exact terms with reference to FIGS. *4a–d*. These figures represents the concurrent states of the potentials, plotted against time, at the different circuit points previously identified: The curve a represents the potential of the connection 48, the curve b represents the state of the potential of the connection 52, the curve c shows the connection 44 and the curve *d* shows the connection 50. The axis of abscissae is the time axis and the axis of ordinates is the voltage axis.

The zero on the time co-ordinate is taken at the instant of closure of the switch 40. In this diagram, it has been assumed that the lines 38 and 34 were identical. At the instant $t=0$, the switch 40 is closed. The potential of the connection 48 suddenly drops from the value U to the value U/2. Conversely, the potential of the connection 52 rises abruptly from the value O to the value U/2. The rectangular pulse derived from the line 34 propagates within the line 38. At the end of a time interval $\tau$, the pulse has reached the end of the line 38, that is to say the connection 50. $\tau$ is therefore the propagation or transit time of the line. This pulse is totally reflected at the end of the line 38 since the impedance 42 is very high in comparison with the characteristic impedance of the line. The reflection from the end of the line 38 results in voltage doubling and this has the effect of causing the potential of the connection 50 to change abruptly to the value $2U/2 = U$. By reason of symmetry, this instant corresponds to the instant at which the potential of the connection 44 drops from the value U to the value 0. At the instant 2 $\tau$, the rectangular pulse travelling in the line covers the line 38 perfectly, with the result that the electrostatic-energy stored initially in the line 34 is now wholly present in the line 38. Since the switch 40 is still closed, the discharge of the line 38 into the line 34 then takes place in a manner symmetrical with the just-described discharge of the line 34 into the line 38. The rectangular wave derived from the line 38 reaches the right end of the line 34 at the instant 3 $\tau$. At this instant, the potential of the connection 44 rises sharply to the value U whereas the potential of the connection 50 falls to the value 0. The process continues indefinitely if the lines and the connections are dissipationless. Throughout the duration of this process, the connections 48 and 52 are always subjected to a rectangular pulse which propagates either from 34 towards 38 of from 38 towards 34, with the result that the potentials of the connections 48 and 52 are continuously equal to U/2.

In the event that the generator in accordance with the invention is employed for triggering a laser system of the type shown in FIG. 1, the terminals 44 and 46 are connected to the electrodes 8 and 9 of the cell 1, with the result that triggering of the laser takes place during the time interval $\tau - 3$ which follows closure of the switch. Since the state of the electrode potentials is a periodic function of time as shown by curve $c$ of FIG. 4, the shutter which is located within the laser cavity is again transparent at the end of the time interval 5 $\tau$ after closure of the switch. In actual fact, this situation is not objectionable since initiation of the laser oscillation within the time interval $\tau - 3\,\tau$ is usually sufficient to reduce the gain of the amplifying medium 6 to a value below the threshold of oscillation, with the result that the first interval $\tau - 3\,\tau$ alone triggers the laser.

It is assumed in the foregoing description of the device according to the invention that the lines 34 and 38 are of identical length. Should the length of the line 38 be different from the length of the line 34, the diagram of FIG. 4 would be slightly modified. In fact, the instant at which the leading edge of the rectangular pulse reaches the end of the line 38 depends on the length of this line. If the ine 38 were shorter than the line 34, the potential of the connection 50 would pass through the valve U earlier than in the case shown in curve d of FIG. 4. The return of the rectangular pulse to the end of the line 34 would also take place sooner than in the case shown in curve c of FIG. 4. In consequence, the shutter opening time would not be equal to the closure time. If the times of transit along the lines 34 and 38 are designated by $\tau_{34}$ and $\tau_{38}$, it can readily be seen that the opening time is equal to 2 $\tau_{38}$ and the closure time is equal to 2 $\tau_{34}$.

The device in accordance with the invention therefore makes it possible to modify the length of the opening or closure times solely by working on the length of the lines 38 and 34. In fact, it is known that the propagation time $\tau$ along a line having a length L is given by $\tau = L/V$, wherein $V$ is the velocity of propagation along the line as can conventionally be calculated by the formula $V = 1/\sqrt{LC}$, where $L$ and $C$ are the self-inductance and capacitance per unit length of line. In the case of the cables which are usually employed as lines, this velocity is in the vicinity of $0.33 \times 10^9$ m/second, so that 1 m of cable is equivalent to a duration of 3 nanoseconds. A rectangular pulse having a duration of 300 nsecs will therefore necessitate a cable 34 having a length of 50 m. The switch 40 usually consists of a spark gap and the lines 34 and 38 are usually coaxial cables but it is wholly apparent that a device which makes use of any other type of switch (such as a thyratron and the like) or any other line (such as a lumped-constant line, for example) would not constitute any departure from the scope of the invention. The relative length of the lines 34 and 38 determines the ratio of the length of the period of zero voltage at the terminal 44 and the time between such periods. Variation of the relative length of the lines in the range of closely related values, for example from 1:5 to 5:1, can provide useful freedom of design in spacing the pulses relative to their duration.

The description which has just been given shows that the pulse generator in accordance with the invention is particularly simple. It calls only for a single high-voltage generator, the output voltage of which is equal only to that voltage which is necessary for polarization of the electrooptical cell. The rectangular pulse generator in accordance with the invention is therefore particularly well suited to the construction of compact assemblies.

What we claim is:

1. A generator for producing electrical pulses having fast rise and fall times interrupting a steadily applied voltage by short periods of substantially zero output voltage, wherein said generator comprises

- a direct-current high-voltage source;
- a first transmission line connected at one end to a high impedance output load and connected at its other end over a high impedance to said high-voltage source, both said high impedances being high relative to the characteristic impedance of said transmission line; and
- a second transmission line of substantially the same characteristic impedance as said first line and of a length relative to that of said first line determined by the desired duty cycle of said pulses within the pulse period thereof, one end of said second line being terminated by as high impedance that is high relative to the characteristic impedance of the lines, and the other end being connected by means of a switch to that end of said first line at which said high impedance connected to said source is connected to said first line.

2. A generator according to claim 1, wherein the transmission lines are coaxial cables.

3. A generator according to claim 1, wherein said first and second lines have relative lengths between the ratios of 5:1 and 1:5.

* * * * *

UNITED STATES PATENT OFFICE
CERTIFICATE OF CORRECTION

Patent No. 3849732 Dated November 19, 1974

Inventor(s) Jacques PEZOT

It is certified that error appears in the above-identified patent and that said Letters Patent are hereby corrected as shown below:

On page 65 of the patent (column 6), claim 1, line 49, after "by" change "as" to -- a --.

Signed and sealed this 18th day of March 1975.

(SEAL)
Attest:

RUTH C. MASON
Attesting Officer

C. MARSHALL DANN
Commissioner of Patents
and Trademarks